OFFSET TRANSITION CONTROL SYSTEM FOR A TRAFFIC CONTROLLER

Filed Jan. 18, 1967 2 Sheets-Sheet 1

INVENTORS
VERNOR B. CRESS, JR.
JACK W. SCHMIDT
BY Edward A. Skolski
ATTORNEY

OFFSET TRANSITION CONTROL SYSTEM FOR A TRAFFIC CONTROLLER

Filed Jan. 18, 1967 2 Sheets-Sheet 2

INVENTORS
VERNOR B. CRESS, JR.
JACK W. SCHMIDT
BY
ATTORNEY

United States Patent Office 3,483,508
Patented Dec. 9, 1969

3,483,508

OFFSET TRANSITION CONTROL SYSTEM FOR A TRAFFIC CONTROLLER

Vernor B. Cress, Jr., Rowland Heights, and Jack W. Schmidt, Thousand Oaks, Calif., assignors to Tamer Electronics Industries, Inc., Los Angeles, Calif., a corporation of Delaware Filed Jan. 18, 1967, Ser. No. 610,150
Int. Cl. G08g *1/00;* G06f *15/48;* G06g *7/76*
U.S. Cl. 340—40 10 Claims

ABSTRACT OF THE DISCLOSURE

This system utilizes digital techniques to provide a gradual adjustment of the timing of a traffic controller into synchronization with a master offset control signal. Briefly stated, this is achieved by means of a computer and storage device which digitally computes the timing difference between the master offset signal and a local offset reference signal. The computer and storage device operates in conjunction with means for reducing, in discrete steps, the offset error represented by this timing difference.

Figure 1:
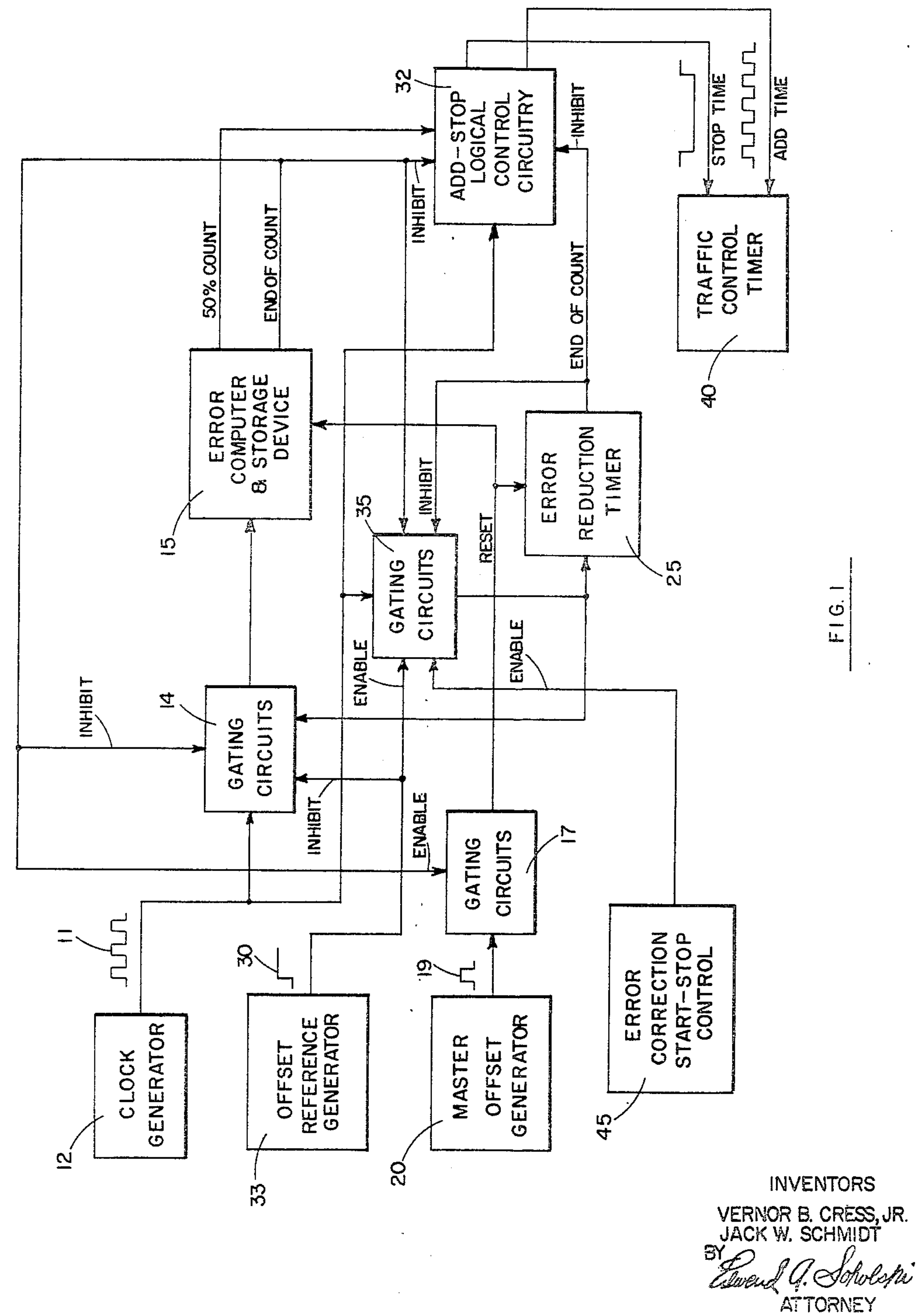

This invention relates to an offset transition control system for a traffic controller and more particularly to such a system utilizing digital techniques.

It is often desirable to adjust the timing of traffic signals at succeeding intersections along a street so that they are offset with respect to each other in a particular manner, this to optimize the control of traffic flow. This end result is often achieved by means of master offset control signals which are transmitted from a central control station. Such signals thus may be generated as desired to set the relative timing between the various succeeding traffic lights to optimize the traffic flow. In most master offset transition control systems of the prior art, the synchronization between the master control signals and the individual local traffic controllers is achieved by holding the local traffic controller in a preselected sequence until the master signal arrives, and then starting a new sequence with the arrival of the master signal. This technique has several shortcomings. Firstly, it requires that the entire correction to bring the local controller into synchronization with the master signal be accomplished during a single timing sequence. This, in situations where the synchronization error is relatively large, could result in a prolongation of the timing sequence long enough to cause a tie-up of traffic. This poses a particular problem on busy streets in situations where the timing changeover is made at a heavy traffic period of the day. Secondly, no means are provided in most of such prior art systems for adjusting the synchronization error in the shortest possible manner, in each instance the local traffic controller being made to "wait" for the synchronization signal even where the synchronization error could be more readily corrected by a slight "speed up" in the operation of the local timing control. Still further, such prior art systems have no means for preventing a synchronization adjustment at an inopportune time, such as, for example, while a change in the timing program of the local controller is being made. An attempted synchronization at a time such as this could cause a serious tie-up of the local controller.

The system of this invention is adapted for operation with a digitally implemented traffic control system such as described in our co-pending application Ser. No. 572,761, filed Aug. 16, 1966, and overcomes the aforementioned shortcomings of prior art systems. This end result is achieved in the system of the invention by utilizing an error computer and storage device comprising a digital counter which measures the timing error between the master offset signal and the local offset reference signal in terms of a digital count which it then stores. The digital error signal stored in the counter is evaluated in logical control circuitry and depending on such evaluation, the timing of preselected timing sequences of the traffic controller are either speeded up or slowed down, as the situation may dictate, to reduce the error to zero in the shortest possible manner. Means are provided for reducing the offset error in discrete steps during the preselected timing sequences, the duration of said error reduction steps being determined by error reduction timer means. Gating means are provided to inhibit the operation of the offset transition control system during certain traffic controller functions when such offset operation is undesirable.

It is therefore an object of this invention to provide an improved offset transition control system suitable for utilization with a digitally implemented traffic control system.

It is a further object of this invention to provide a digital offset transition control means in which synchronization with a master offset signal is achieved in gradual steps so that normal traffic timing is not radically affected.

It is still another object of this invention to provide means for synchronizing a local traffic controller with a master traffic control signal with a minimum disruption of traffic control functions during the transition involved.

Figure 2:
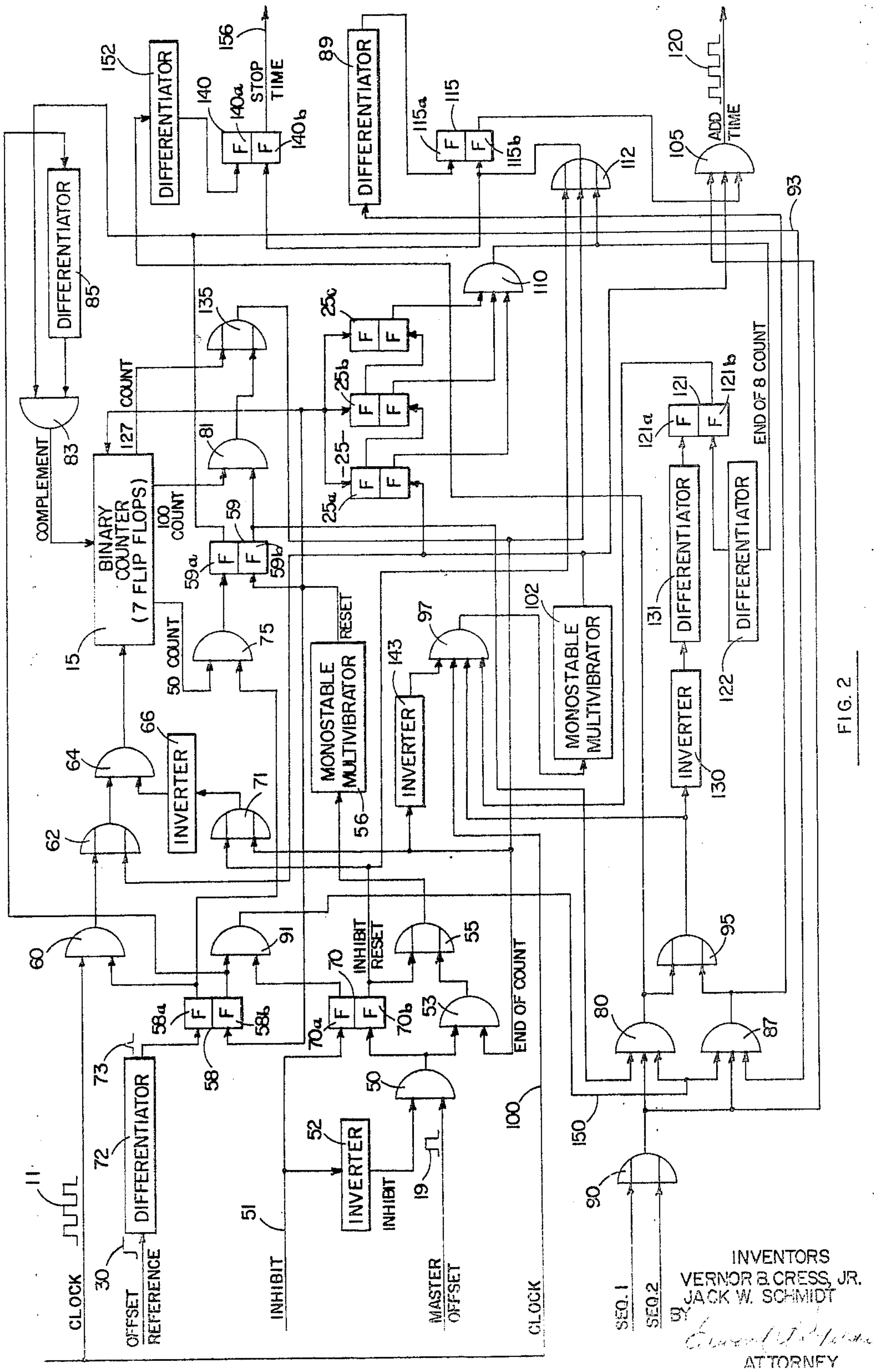

Other objects of this invention will become apparent from the following description taken in connection with the accompanying drawings of which:

FIG. 1 is a functional block diagram illustrating the basic operation of the system of the invention, and FIG. 2 is a schematic drawing of a preferred embodiment of the system of the invention, Referring now to FIG. 1, the basic operation of the system of the invention is illustrated. Clock pulses 11 are fed from clock generator 12 (utilized to control timing in the traffic controller) through gating circuits 14 to error computer and storage device 15. Error computer and storage device 15 may, as to be explained in connection with FIG. 2, comprises a digital counter. When the computer and storage device is "full," i.e., when it counts up to a predetermined maximum count, an end of count signal is fed from error computer and storage device 15 to gating circuits 17, enabling these circuits to pass a signal therethrough. The object of master offset generator 20 which is in the form of master synchronization pulses 19 is fed through gating circuits 17, once these gating circuits have been "enabled" to pass signals by virtue of the end of count signal, to provide a reset signal which resets error computer and storage device 15 and error reduction timer 25 to their "zero" condition which establishes their operational starting points.

It is to be noted that when the end of count is reached, an "inhibit" signal is fed from error computer and storage device 15 to gating circuits 14 to prevent clock pulses 11 from reinitiating the count in error computer and storage device 15 until the computer and storage device has been reset. With the resetting of the computer and storage device on the arrival of synchronization pulses 19, this inhibit signal is removed from gating circuits 14 and clock pulses 11 are permitted to pass therethrough to commence advancing the count in the error computer storage device.

Offset reference generator 33 is a part of the local traffic controller such as the sequence control thereof and may indicate any preselected point in the timing cycle, such as, for example, the start of a particular timing sequence. The output signal 30 of offset reference generator 25 thus represents the local timing reference point which is to be synchronized with the master synchronization signal 19. Offset reference signal 30 provides an inhibit signal to gating circuits 14 which stops the further feeding of clock pulses 11 therethrough to computer and storage device 15. Thus, with the arrival of offset reference signal 30, the count in error computer and storage device is stopped, the count up to this point representing the error signal or the time difference between signals 19 and 30. This signal is stored in the error computer and storage device.

If the error signal stored in the computer and storage device 15 represents 50% or more of the total timing cycle of the traffic controller, then a signal is fed therefrom to add-stop logical control circuitry 32 which causes this control circuitry to initiate a "stop" time mode of operation which in effect lengthens the timing cycle of traffic control timer 40 to allow the master offset to effectively "catch up" with the local reference. On the other hand, if the 50% count signal is not present, indicating the error is less than 50% of the timing cycle, add-stop logical control circuitry 32 is caused to provide additional pulses to in effect speed up or shorten the timing cycle of traffic control timer 40 so that the local controller can catch up with the master offset signal. Thus, in either situation the shortest route to eliminating the error signal is taken.

As already noted, error reduction timer 25 is reset with the arrival of the master offset pulse 19. In the reset condition, which corresponds to the end-of-count condition, an inhibit signal is fed from error reduction timer 25 to grating circuits 35. In view of this inhibit signal, clock pulses will not pass through gating circuits 35 to the error reduction timer. At the start of one of the timing sequences which has been preselected for error reduction, a signal is fed from error correction start-stop control 45 to gating circuits 35 which enables these gating circuits to commence passing clock pulses through to error reduction timer 25, effectively negating the inhibit signal from error reduction timer 25. Clock pulses 11 are also fed from gating circuits 35 through gating circuits 14 to advance error computer and storage device 15 to reduce the error count in this device accordingly.

It is also to be noted that clock pulses 11 cannot be passed to error reduction timer 25 through gating circuits 35 except after the offset reference signal 30 has arrived to stop the count in the error computer and storage device. This end result is achieved by feeding reference signal 30 to gating circuit 35 as an enabling signal. In this manner, the commencement of the reduction of the error signal is prevented until the first preselected error correction sequences subsequent to the computation of the error signal. When error reduction timer 25 has completed its timing sequence, an end of count signal is fed therefrom to add-stop logical control circuitry 32 to inhibit further error correction, i.e., either the speed-up or slow-down of the timing of traffic control timer 40 as the case may be.

An inhibit signal is also fed from error reduction timer 25 to gating circuits 35 to terminate the feeding of clock pulses to gating circuits 14 and the error reduction timer itself. The error reduction timer 25 stays in its end of count or "zero" condition until the commencement of the next error correction sequence as indicated by a signal from error correction start-stop control 45, at which time the operation is repeated to again reduce the error signal a finite amount as determined by the timing cycle of error reduction timer 25. It thus can be seen that in this manner the error signal is reduced in predetermined steps over a number of timing sequences so that there is no abrupt change effected in the timing operation of the traffic controller in achieving the desired synchronization with the master control signal.

Referring now to FIG. 2, a schematic drawing of a preferred embodiment of the device of the invention is shown. In the logical control circuitry shown, the outputs of conductive flip-flop stages provide "FALSE" inputs to the AND and OR gates, while the outputs of non-conductive flip-flop stages provide "TRUE" inputs to these gates.

Master offset signal 19 with which the local control is to be synchronized is fed to AND gate 50. In the absence of an inhibit signal on line 51, inverter 52 which may comprise an inverting amplifier is non-conductive and has a TRUE output to AND gate 50. Under such conditions, with the appearance of master offset signal 19 a TRUE signal is fed from AND gate 50 to AND gate 53. AND gate 53 will have a TRUE output when actuated by the output of AND gate 50 if binary counter 15, which comprises the error computer and storage device, has reached its maximum count of 127 or is at a count of 100, either of these conditions, as to be explained further on in the specification, indicating an end of count condition. It is to be noted that when such an "end of count" condition occurs, the further passage of clock pulses 11 to counter 15 is inhibited by virtue of an "end of count" signal fed from OR gate 135 through OR gate 70 and inverter 66 to AND gate 64. The TRUE output of AND gate 53 is fed to OR gate 55. This signal passes through OR gate 55 and actuates monostable multivibrator 56. When so actuated, multivibrator 56 produces a reset signal which resets binary counter 15 as well as the flip-flops *25a–25c* of error reduction timer 25. The reset signal from monostable multivibrator 56 also resets flip-flops 58 and 59. It is to be noted at this point that binary counter 15 in the preferred embodiment includes seven flip-flops to provide a maximum count of 127. However, the timing cycle of the traffic controller is equivalent to a 100 count of this counter.

Clock pulses 11 are arriving continually and with the resetting of flip-flop 58 by the signal from multivibrator 56, stage **58*a* thereof is driven to the non-conductive state providing a TRUE output therefrom to AND gate 60. This enables clock pulses 11 to pass through AND gate 60 to OR gate 62. Clock pulses 11 are passed through OR gate 62 to AND gate 64. In the absence of an input signal to inverter 66, this inverter will have a TRUE output to AND gate 64. The input of inverter 66 is connected to OR gate 71. OR gate 71 only has a TRUE input when the end-of-count signal is present or when there is an inhibit signal arriving from flip-flop 70. The end-of-count signal having been effectively erased by the reset signal from multivibrator 56 and assuming that no inhibit signal is present, inverter 66 will provide an "enabling" signal to AND gate 64, and clock pulses will be fed through this gate to counter 15**. These clock pulses will start driving this counter upwardly from its zero count condition.

Counter 15 will continue to count upwardly until the arrival of offset reference signal 30, at which time the count will be halted in the following manner. The leading edge of offset reference signal 30 is differentiated by differentiator 72 to produce a sharp trigger pulse 73. Trigger pulse 73 drives stage **58*a* of flipflop 58 to the conductive state. This produces a FALSE output from flipflop stage 58*a* to AND gate 60, thus inhibiting the further passage of clock pulses 11 through this gate. The count in binary counter 15 indicates the timing difference between master offset signal 19 and offset reference signal 30** which represents the offset error which is to be corrected for.

The error signal is stored in counter 15 and reduced in discrete steps in the following manner. First a logical decision is made as to whether the error signal can be most efficiently eliminated by lengthening or shortening the traffic controller timing cycle. Prior to the arrival of offset reference signal 30, flipflop stage **58*a* is in the non-conductive or TRUE state and provides an enabling signal to AND gate 75. Thus, if the 50th count of counter 15** is reached prior to the arrival of the offset reference signal 30, the 50 count signal will cause AND gate 75 to have a TRUE output which drives flipflop stage 59a to the conductive condition. This causes flipflop stage 59b to go to the non-conductive condition in which state it generates a TRUE output. This TRUE output is fed to AND gate 80 and also to AND gate 81.

Let us assume on the other hand that the 50th count has not been reached in binary counter 15, at the time that the count is stopped with the arrival of offset signal 30. Under such conditions, flipflop stage 59a will remain in the non-conductive state thereby providing a TRUE signal from this gate to AND gates 83 and 87. Thus, at the very instant that the offset reference signal 30 arrives, a TRUE signal will be received from flipflop stage 58b as it goes to cutoff, this signal being differentiated by differentiator 85. AND gate 83 having two TRUE inputs at this instant generates an output signal to binary counter 15 which drives this counter to its complementary condition. This means, for example, if the counter had counted to 30, at the time the count was stopped, it would be flipped over to effectively read a count of 127 (maximum count) minus 30, or 97. In this fashion the counter is made to operate so that its error signal can always be zeroed out by an upward count.

In the embodiment of FIG. 2, error reduction is accomplished during either "sequence 1" or "sequence 2" of the timer timing cycle. These two sequences may, for example, comprise both of the green signal timing sequences of the traffic lights at the street intersection being controlled. During both of these timing sequences, a control signal is fed to OR gate 90 which generates a TRUE output therefrom to provide an enabling signal for both AND gates 80 and 87. These two AND gates thus can have TRUE output only during these preselected sequences of operation. AND gates 80 and 87 also require an enabling signal from AND gate 91. AND gate 91 will have a TRUE output to provide such an enabling signal only in situations where both flipflop stages 58b and 70a have TRUE outputs, i.e., when these flipflop stages are non-conductive. Such is the case after offset reference signal 30 has arrived to actuate flipflop stage 58a, and in the absence of an inhibit signal on line 51 which would actuate flipflop stage 70a.

Let us assume that both of the aforementioned enabling signals for gate 87 are present and the count in binary counter 15 is under the 50 count. Under such conditions, as already noted, the counter will be set to its complementary state. At the same time, a TRUE output signal is fed in line 93 from flipflop stage 59a to AND gate 87. AND gate 87 will then generate a TRUE output which is fed to OR gate 95 and to differentiator 89. The output of differentiator 89 drives flipflop stage 115a to conduction, thereby providing a TRUE output from stage 115b to AND gate 105. The TRUE output of OR gate 95 generated in response to the output of AND gate 87 provides an enabling signal to AND gate 97. Assuming the other enabling signals are present at the input of AND gate 97, these other signals, as to be explained further on in the specification, comprising various interlocks to inhibit the operation of this AND gate under certain predetermined conditions, then clock pulses 11 arriving at the AND gate on line 100 are passed through the gate to monostable multivibrator 102. The output of monostable multivibrator 102 is connected to drive error reduction timer 25 and to the input of AND gate 105. Error reduction timer 25 has a maximum count of 8, and thus counts 8 clock pulses 11, after which it generates an output signal which drives AND gate 110 to its TRUE condition. The output of AND gate 110 is fed to OR gate 112 which in turn drives flipflop stage 115b to its conductive or FALSE state. The output of flipflop stage 115b is connected to AND gate 105 and therefore with the end of the 8 count of error reduction timer 25, the further passage of clock pulses through gate 105 is inhibited by the FALSE output of this flipflop. Thus, during this sequence, 8 pulses are fed through AND gate 105. These pulses 120 which are used to speed up or shorten the timing sequence of the traffic controller are fed to the timing circuit of such controller to accomplish this end result.

At the same time as clock pulses 11 are being fed to error reduction timer 25 and AND gate 105, they are also being fed from multivibrator 102 to OR gate 62 and thence through AND gate 64 to the input of binary counter 15. Thus the error count in the binary counter is also reduced by 8 counts at the same time that the error reduction is being made in the traffic controller timer.

It is to be noted that clock pulses 11 are utilized in the traffic controller timing circuits and that in order to avoid overlap between the regular timing pulses for the traffic controller timer and the correction signals fed thereto from AND gate 105, that trailing edge differentiation is utilized in the input circuits of monostable multivibrator 102 so that the "add time" signals 120 are offset slightly in their timing with respect to clock pulses 11.

At the end of the 8 count, a signal is fed from AND gate 110 through differenitator circuit 122 to flipflop stage 121b of flipflop 121. This generates a FALSE output in flipflop stage 121b which provides an inhibit signal to AND gate 97. This prevents the further passage of clock pulses through AND gate 97 to monostable multivibrator 102, thus halting the error correction operation. Flipflop 121 is reset for a subsequent error correction sequence at the termination of each error correction sequence. This is achieved at the end of each such sequence by the appearance of a FALSE output from OR gate 95. This FALSE signal is inverted in inverter 130 to a TRUE signal The output of inverter 130 is differentiated in differentiator 131, the output of which drives flipflop stage 121a to the conductive state, thereby resetting the flipflop to provide a TRUE output at flipflop stage 121b.

With the arrival of the next error correction sequence, the operation is repeated with an additional 8 "add-time" signals 120 being fed to the traffic controller timer and with a further reduction of 8 in the error count stored in binary counter 15. This process is continued with the error being reduced during each error correction sequence by 8 counts until there is no more error count in binary counter 15 and the timing error between offset reference 30 and master offset 19 has been reduced to zero. When this occurs, in the case of error counts under 50 where the counter has been shifted to its complementary state, the counter will be in the 127 or full count condition, a signal in such case being provided from counter 15 to OR gate 135 to generate a TRUE output from this gate. This TRUE signal is fed from OR gate 135 through OR gate 112 to reset flipflops 115 and 140 so as to prevent further timing correction outputs. This signal is also fed to inverter 143 to provide an inhibit signal for AND gate 97 to prevent the further passage of clock pulses through this gate to either error reduction timer 25 or binary counter 15. This signal is further fed to AND gate 53 so that with the arrival of a subsequent master offset signal 19 a reset signal will be provided to monostable multivibrator 56 for resetting binary counter 15, error reduction timer 25 and flipflops 58 and 59. It is to be noted that in view of the leading edge differentiation of offset reference 30 to produce a sharp trigger pulse 73, upon the synchronization of this reference signal with master offset signal 19, the master offset signal will be present a short period of time after the offset reference signal has disappeared This means that when synchronization has been achieved, master offset signal 19 will reset binary counter 15 and this counter will then count up to its 100 count in response to clock pulses 11; at which time the count will momentarily be stopped with the arrival of the offset reference signal 30; after which the counter will be reset by the master offset signal 19 to resume its count. Thus, with the offset reference and master offset signals in synchronization, binary counter 15 will continually count up to 100 in a cyclical fashion.

In the event that the count in binary counter 15 is 50 or greater, at the time such count is stopped by offset reference signal 30, the timing intervals of the traffic controller timer are lengthened to permit the master offset signal to in effect "catch up" with the offset reference. This is achieved in the following manner. When the 50th count of the counter is reached prior to the arrival of the offset reference signal, indicating that the error signal is greater than 50, AND gate 75 generates a TRUE output which drives flipflop 59 so that stage 59*b* thereof has a TRUE output. This TRUE output is fed to AND gate 80. With the commencement of the error correction sequences (either sequence 1 or 2) and in the absence of an inhibit signal on line 150, AND gate 80 will generate a TRUE output. This TRUE output is fed through differentiator 152 to flipflop 140 and drives flipflop stage 140*a* to conduction with flipflop stage 140*b* being driven to cutoff. Thus, flipflop stage 140*b* will generate a TRUE output on control line 156, which is connected to the traffic controller timer, this output being utilized to stop the timing operation of the traffic controller. Such timing operation is halted for a period equivalent to the time it takes to count 8 clock pulses 11 in error reduction timer 25. This is achieved in the same manner as described in connection with the add-time correction, the TRUE output of OR gate 95 being fed to AND gate 97, thus enabling clock pulses 11 to pass to error reduction timer 25 to drive this counter to its maximum count of 8 and also to binary counter 15 to reduce the error count in this counter accordingly. When the 8 count of error reduction timer 25 has been completed, a signal is fed therefrom to AND gate 110, this signal thence being fed through OR gate 112 to flipflop 140 to drive stage 140*b* to the FALSE state thereby terminating the stoptime control signal. In this manner, just as described in connection with the add-time function, preselected timing sequences of the traffic controller are lengthened in discrete steps to reduce the synchronization error to zero.

It thus can be seen that the local traffic controller is brought into synchronization with the master offset signal in a most expeditious manner with a logical determination being made as the whether speeding up or slowing down the traffic controller timing cycle would best achieve the desired end result. Once this logical decision has been made, the error is reduced in predetermined discrete steps during chosen timing sequences, whereby such correction can be effected without hampering normal traffic control functions. The device of this invention thus provides highly efficient digitally implemented means for synchronizing a digital traffic control system with a master offset signal.

We claim:

1. In a digitally timed traffic controller including a clock generator for generating timing pulses therefor, means for generating a master offset signal, and means for generating control signals indicative of predetermined timing sequences thereof; an offset transition control system for synchronizing the timing operation of said traffic controller with said master offset signal, said offset transition control system comprising means for generating an offset reference signal, error computer and storage means for digitally computing the timing difference between said master offset and offset reference signals and storing a signal in accordance therewith, said error computer and storage means including a counter connected to receive said timing pulses, said master offset signal operating to reset said counter, said offset reference signal operating to stop the counting operation of said counter, the count on said counter representing the timing difference, and means for reducing the computed timing difference in discrete steps during said predetermined traffic controller timing sequences.

2. The system as recited in claim 1 wherein said means for reducing the computed timing difference includes logical control circuitry responsive to the computed timing difference signal stored in said error computer and storage means for alternatively either stopping or speeding up the timing operation of said traffic controller to reduce the timing difference to zero.

3. The system as recited in claim 2 wherein said means for reducing the timing error further includes error reduction timer means responsive to said clock generator and to said control signals indicative of predetermined timing sequences for timing each of said discrete steps.

4. The system as recited in claim 3 wherein said error reduction timer means comprises a digital counter.

5. The system as recited in claim 1 and further including means for inhibiting the operation of said means for reducing the computed timing difference during predetermined traffic controller operations.

6. In a digitally timed traffic controller including a clock generator for generating timing pulses therefor, means for generating a master offset signal, and means for generating control signals indicative of predetermined timing sequences thereof; an offset transition control system for synchronizing the timing operation of said traffic controller with said master offset signal, said offset transition control system comprising means for generating an offset reference signal, digital computer and storage means for computing the timing difference between said master offset and offset reference signals, gating circuit means interposed between said clock generator and said computer and storage means, said gating circuit means being adapted to stop the passage of pulses from said clock generator to said computer and storage means in response to said offset reference signal, said computer and storage means including a digital counter connected to receive said timing pulses through said gating circuit means, said master offset signal operating to reset said counter, the count on said counter representing the timing difference, and means for reducing the offset error in discrete steps during said predetermined traffic controller timing sequence, said error reducing means including logical control circuitry for alternatively either stopping the timing of said traffic controller or speeding up the timing operation thereof in response to the timing difference computed by said computer and storage means, and error reduction timer means responsive to said clock generator and operative only during said predetermined timing sequences for timing each of said discrete steps.

7. In combination, a digitally timed traffic controller including a clock generator for generating timing pulses therefor, means for generating a master offset signal, and means for generating control signals indicative of predetermined timing sequences thereof; and an offset transition control system for synchronizing the timing operation of said traffic controller with said master offset signal, said offset transition control system comprising means for generating an offset reference signal, digital computer and storage means for computing the timing difference between said master offset and offset reference signals, said computer and storage means including a digital counter, said counter being reset in in response to the master offset signal, gating circuit means interposed between said clock generator and said digital counter, said gating circuit means being adapted to stop the passage of pulses from said clock generator to said counter in response to said offset reference signal, the pulse count of said counter being indicative of the offset error, and means for reducing the offset error in discrete steps during said predetermined traffic controller timing sequences, said error reducing means including logical control means for alternatively either stopping the timing of said traffic controller or speeding up the timing operation thereof depending on which is the shortest way to reduce the error to zero, and error reduction timer means responsive to said clock generator and operative only during said predetermined timing sequences for timing each of said discrete steps.

8. The system as recited in claim 7 wherein said error reduction timer means includes a digital counter, gating circuit means for controlling the passage of pulses from said clock generator to said counter and gating circuit means for terminating the counting operation of said counter when a saturation count therein has been reached.

9. The system as recited in claim 8 wherein said logical control means includes gating means for modifying the timing operation of said traffic controller in response to the digital counter of said error reduction timer means.

10. The system as recited in claim 9 wherein said gating means for modifying the timing operation of said traffic controller includes "add time" gating means for feeding clock pulses to said controller and "stop time" gating means for stopping the timing operation of said controller.

References Cited

UNITED STATES PATENTS

| | | | |
|---|---|---|---|
| 3,252,133 | 5/1966 | Auer | 340—40 |
| 3,252,134 | 5/1966 | Auer | 340—35 |

THOMAS B. HABECKER, Primary Examiner

U.S. Cl. X.R.

235—150.24